United States Patent Office 2,864,742
Patented Dec. 16, 1958

2,864,742

COPPER SALTS OF NONYLATED NAPHTHALENE SULFONIC ACIDS

Richard R. Whetstone, Orinda, Frank C. Davis, Richmond, and Carl M. Monroe, Modesto, Calif., assignors to Shell Development Company, New York, N. Y., a corporation of Delaware No Drawing. Application December 23, 1953
Serial No. 400,138

8 Claims. (Cl. 167—32)

This invention relates to novel copper salts of alkylated aromatic sulfonic acids. It also relates to fungicidal compositions and to a method of controlling fungi.

In accordance with the present invention, there are provided copper salts of nonylated aromatic sulfonic acids, specifically cupric dinonyl naphthalenesulfonate and cupric ammonium dinonyl naphthalenesulfonate.

Also in accordance with the present invention, it has been found that copper salts of nonylated aromatic sulfonic acids are particularly effective as foliage fungicides.

The copper salts, including cuprammoniacal salts of the present invention are readily prepared by first alkylating an aromatic compound with a $C_9$-olefin or $C_9$-alkyl halide which may be either straight chain or branched-chain. A particularly suitable alkylating agent is propylene trimer which is a branched-chain olefin. The aromatic compound employed should contain no substituents, such as the hydroxyl radical, which may impart phytotoxicity to the copper salt being prepared. The aromatic compound used is preferably an aromatic hydrocarbon which may be either monocyclic or polycyclic. Examples of suitable aromatic hydrocarbons are benzene, naphthalene, toluene, xylenes, ethyl benzenes, methyl naphthalenes, ethyl naphthalenes, and the like. The resulting nonylated aromatic compound is then sulfonated by reaction with a suitable sulfonating agent, such as concentrated sulfuric acid, sulfur trioxide, sulfonyl chloride, etc., and the product is neutralized with an inorganic alkali metal base. The resulting alkali metal salt of a nonylated aromatic sulfonic acid is then converted to the corresponding copper salt by a metathetical reaction with a suitable inorganic copper salt, such as copper sulfate or copper nitrate. The corresponding cuprammoniacal salts can be prepared by carrying out the aforementioned metathesis in the presence of aqueous ammonia or an organic base characterized by a sufficient basicity to be capable of entering into the formation of a cuprammoniacal complex compound when in contact with copper salts. Representative suitable amino compounds include normal and isopropylamine, normal and isoamylamine, normal and isohexylamine, mono-, di- and triethanolamines, propanolamine, aniline, dimethylaniline, toluidine, xylidine, morpholine, pyridine and quinoline.

The novel copper salts of the present invention are illustrated by the following examples which are not to be construed as limiting the specification and claims in any manner:

EXAMPLE I.—CUPRIC DINONYL NAPHTHALENE-SULFONATE

The alkylation of naphthalene with propylene trimer was carried out at 60° C. using a mole ratio of propylene trimer to naphthalene of 2:1, 12% w. (based on naphthalene) of aluminum chloride as catalyst, and hexane as solvent. Upon completion of the reaction, the aluminum chloride sludge was drained and the organic phase washed with 20% aqueous sodium hydroxide and topped to a stillhead temperature of 80° C. to remove hexane. The bottoms were then distilled under reduced pressure and separated into unreacted propylene trimer, unreacted naphthalene, light hydrocarbon polymers, and a "bottoms" product consisting of alkylated naphthalene and heavy hydrocarbon polymers having a molecular weight of 378. The "bottoms" product was topped at a pressure of 20 mm. absolute to a stillhead temperature of 215° C. and the bottoms thus obtained were designated as (full range) nonylnaphthalenes. The bottoms were distilled at a pressure of 10 mm. absolute into two fractions: one boiling at 188.5–193° C. at 10 mm. absolute and having a molecular weight of 268, which fraction was mononoylnaphthalene, and the other boiling at 248–259° C. at 10 mm. absolute, and having a molecular weight of 372, which fraction was dinonylnaphthalene.

The dinonylnaphthalene was sulfonated with sulfur trioxide at $-15°$ C. in sulfur dioxide and carbon tetrachloride solvent, using a 20% molar excess of sulfur trioxide. The resulting material was allowed to warm slowly and sulfur dioxide boiled off. The material was diluted with 50% w. of isopropyl alcohol in water, blown with nitrogen to remove residual $SO_2$, and then neutralized with 30% w. NaOH. Carbon tetrachloride was stripped from the neutralized material and the stripped material was filtered to obtain a solution containing 35.5% w. of sodium dinonyl naphthalenesulfonate. Five parts by weight of the sodium salt solution was diluted with 3.7 parts by weight of isopropyl alcohol and 3.7 parts by weight water and then reacted with 1.6 parts by weight of cupric sulfate (.5 $H_2O$) in 9 parts by weight of water at 24–77° C. The reaction time was 3 hours. The reaction product was diluted with 11 parts by weight of benzene and stirred for an additional 3 hours at 76–78° C. An aqueous phase separated and was removed. The benzene solution of cupric dinonyl naphthalenesulfonate was washed with water. The washed material was stabilized at about 300 mm. Hg absolute and the stabilization was completed at 100° C. kettle temperature and 100 mm. Hg absolute. The bottoms were diluted with two weights of isopropyl alcohol and some isopropyl alcohol and benzene were distilled off to a final stillhead temperature of 80° C. at atmospheric pressure. The bottoms were filtered and stabilized in a Claisen flask to 100° C. kettle temperature at 1 mm. Hg pressure.

EXAMPLE II.—CUPRIC AMMONIUM DINONYL NAPHTHALENESULFONATE

Five parts by weight of a solution containing 35.5% w. of sodium dinonyl naphthalenesulfonate which was obtained in the same manner as described in Example I, was diluted with 3.7 parts by weight of isopropyl alcohol and 3.7 parts by weight of water. The resulting solution was reacted with 1.6 parts by weight of cupric sulfate (.5 $H_2O$) in 7.1 parts by weight of water and with 3 parts by weight of 28% aqueous ammonia at 76–79° C. The reaction time was 3 hours. The reaction product was diluted with 11 parts by weight of benzene and stirred for an additional 3 hours at 76–78° C. An aqueous phase separated and was removed. The benzene solution of cupric ammonium dinonyl naphthalenesulfonate was washed with water. The washed material was stabilized at about 300 mm. Hg absolute and the stabilization was completed at 100° C. kettle temperature and 100 mm. Hg absolute. The bottoms were diluted with 2 weights of isopropyl alcohol and some isopropyl alcohol and benzene were distilled off to a final stillhead temperature of 80° C. at atmospheric pressure. The bottoms were filtered and stabilized in a Claisen flask to 100° C. kettle temperature at 1 mm. Hg pressure.

In the same manner as described in Examples I and II, the cupric and cupric ammonium salts of (full range) nonyl naphthalene-sulfonic acid and of mononyl naphthalene sulfonic acid were prepared.

The copper salts of the present invention are extremely effective for controlling fungi. Not only are they highly fungitoxic, but they are substantially non-pyhtotoxic. In addition, they show very little selectivity in their action, being effective against a wide variety of plant diseases such as late blight of celery (*Septoria apii-graveolentis*), early blight of celery (*Cercospora apii*), anthracnose of lettuce (*Marssonia panattoniana*), late blight of potato (*Phytophthora infestans*), and early blight of potato (*Alternaria solani*).

The present fungicidal agents are unique in that they are oil-soluble. This characteristic greatly enhances their resistance to weathering. For example, cupric dinonyl naphthalensulfonate, Bordeaux mixture, and a commercial fungicide sold under the trade name "Orthocide-406" and comprising N-(trichloromethylmercapto)-4-cyclohexene-1,2-dicarboximide were subjected to tenacity tests which were based upon the effectiveness of the chemical to control bean rust (*Uromyces appendiculatus*) following treatment with "simulated rain." During the period of weathering all treatments were subjected to approximately 0.25 inch of water. Cupric dinonyl naphthalenesulfonate was found to be outstanding in resisting weathering, having outperformed the commercial fungicides with which it was compared.

The copper salts of nonylated aromatic sulfonic acids can be advantageously utilized as dusts, in solution in organic liquids, and in aqueous emulsions. The fungicidal agent is generally employed in the composition in concentrations of from about 0.05% to about 5% by weight.

The copper salts of the invention are usually formulated as concentrate compositions comprising the copper salt dissolved in one or more hydrocarbon solvents and an emulsifier to promote dispersion of the concentrate in water. The hydrocarbon solvent is preferably a monocyclic aromatic hydrocarbon, such as benzene, toluene, xylene, or mixtures thereof. A suitable mineral oil can also be employed as solvent. In order to insure safety from phytotoxic activity, the mineral oil used should have an unsulfonatable residue above about 80% and preferably about 90%. To reduce the danger of phytotoxicity of the solvent, a portion of the hydrocarbon solvent can be replaced by a relatively low molecular weight aliphatic hydrocarbon, such as dipentene, diisobutylene, propylene trimer, propylene tetramer, and the like, or by a suitable polar organic liquid, preferably oxygenated organic compound, such as an ether, alcohol, or ketone, of not more than about 10 carbon atoms. Examples of suitable oxygenated compounds are: acetone, methyl ethyl ketone, methyl isobutyl ketone, diisobutyl ketone, isophorone, dioxane, isopropyl ether, isopropyl alcohol, tertiary butyl alcohol, tertiary amyl alcohol, and the like.

Emulsifiers which can be employed can be either cationic, anionic, or non-ionic. Examples of suitable emulsifiers are sodium petroleum sulfonates, sodium alkyl sulfates of at least about 12 carbon atoms, mixtures of fatty acid esters of polyethylene glycols, aromatic polyethylene glycol ethers, polyoxyethylene lauryl alcohols, dimeric dialkylphenoxypolyethoxyethanols, glyceryl phthalic alkyd resins, polymeric condensation products of alkylene groups and long chain aliphatic amines and amides, etc. Generally, anionic emulsifiers are preferred.

The above-described concentrates generally contain from about 10% to about 50% of the active ingredient and are usually emulsified in sufficient water to bring the concentration of the active ingredient down to between about 0.05% and about 5% by weight of the total formulation. A typical formulation of an emulsifiable concentrate is as follows:

| | Percent weight |
|---|---|
| Cupric dinonyl naphthalenesulfonate | 30 |
| Xylene | 40 |
| Isophorone | 20 |
| Emulsifier (sodium petroleum sulfonates) | 10 |

The isophorone in the above formulation can be replaced with dipentene and/or isopropyl alcohol.

Emulsions of the present fungicidal agents are generally applied to plants to be treated at the rate of from about 10 gallons to about 200 gallons per acre, and preferably from about 100 gallons to about 160 gallons per acre.

The efficacy and the superiority of the copper salts of the present invention are illustrated by the following example which are not to be construed as limiting the specification or claims in any manner:

EXAMPLE III

The combined foliage-fungicide activity index (F-F. A. I.) for four diseases, namely, *Phytophthora infestans* (late blight of tomato), *Septoria apii-graveolentis* (late blight of celery), *Erysiphe polygoni* (bean powdery mildew), and *Uromyces appendiculatus* (bean rust), was determined for the following chemicals:

Cupric dinonyl naphthalenesulfonate
Dinonyl naphthalenesulfonic acid
Ferric dinonyl naphthalenesulfonate
Chromium dinonyl naphthalenesulfonate
Silver dinonyl naphthalesnesulfonate
Diisopropylammonium dinonyl naphthalenesulfonate
Sodium dinonyl naphthalenesulfonate The foliage-fungicide activity index can be defined as a value representing the ratio between the percent of disease control obtained by the test chemical and that obtained by the use of the standard fungicide. The combined index represents the summation of values obtained for the four diseases. The standard fungicide used in all tests was a commercial fungicide sold under the trade name of "Orchocide-406" and comprising N-(trichloromethyl-mercapto)-4-cyclohexene-1,2-dicarboximide. In all tests the dosage level was 0.24% w. or approximately 2 lbs. per 100 gal. per acre. The results are given in Table I.

*Table I*

| Chemical | Combined Index |
|---|---|
| Cupric dinonyl naphthalenesulfonate | 0.95 |
| Dinonyl naphthalenesulfonic acid | 0.76 |
| Ferric dinonyl naphthalenesulfonate | 0.78 |
| Chromium dinonyl naphthalenesulfonate | 0.66 |
| Silver dinonyl naphthalenesulfonate | 0.80 |
| Diisopropylammonium dinonyl naphthalenesulfonate | 0.77 |
| Sodium dinonyl naphthalenesulfonate | 0.74 |

In the above data, a difference of 0.1 unit represents, statistically, a highly significnt difference. Thus it can be seen from the data in the above table that cupric dinonyl naphthalenesulfonate is highly significantly more fungitoxic than related compounds.

EXAMPLE IV

A cupric nonylated naphthalenesulfonate containing a substantial proportion of cupric dinonyl naphthalenesulfonate and the cupric salt of oil-soluble petroleum sulfonic acids were tested for the control of early blight of celery (*Cercospora apii*). Each of the agents was applied in emulsion formulation, the emulsion being prepared from a concentrate comprising 30% w. of the active agent, 45% w. of isophorone, 15% w. of a hydrocarbon solvent, and 10% w. of sodium petroleum sulfonates as emulsifier. During the interval of the test a total of 15 applications were made at 4-7 day intervals. Both treatments were applied at the rate of 160-180 gallons per acre. Disease control and yield data for the different dosages employed are presented in Table II.

Table II

| Treatment | Dosage, Lbs./100 Gal. at 160-180 Gal./A. | Final Readings, Mean | |
|---|---|---|---|
| | | Percent Disease | Yield, Lbs./Plot [1] |
| Cupric nonylated naphthalenesulfonate | 2 | 6.6 | 105.3 |
| | 4 | 6.6 | 109.7 |
| Cupric petroleum sulfonate | 2 | 23.3 | 87.0 |
| | 4 | 11.6 | 85.0 |
| Control | | 45.0 | 88.7 |

[1] Celery plants were cut to 16" and the blighted foliage removed before weighing.

From the above data, the superiority of the copper salts of the present invention over cupric petroleum sulfonates is readily evident.

EXAMPLE V

The cupric salts of mononyl-, dinonyl-, and (full range) nonyl naphthalenesulfonates and cupric ammonium dinonyl naphthalenesulfonate were tested for the control of anthracnose of lettuce (*Marssonina panattoniana*). Seven applications of spray were made at 6-8 day intervals. High-volume application rates of approximately 150 gallons per acre were used for all treatments. Disease control data for the different dosages employed are presented in Table III.

Table III

| Treatment | Dosage, Lbs./100 Gal. at 150 Gal./Acre | Final Reading, Mean percent Disease |
|---|---|---|
| Cupric mononyl naphthalenesulfonate | 1 | 15.6 |
| | 2 | 5.0 |
| Cupric dinonyl naphthalenesulfonate | 1 | 5.0 |
| | 2 | 0.6 |
| Cupric (full range) nonyl naphthalenesulfonate | 1 | 17.5 |
| | 2 | 3.1 |
| Cupric ammonium dinonyl naphthalenesulfonate | 1 | 6.3 |
| | 2 | 0 |
| Control | | 48.8 |

EXAMPLE VI

A cupric nonylated naphthalenesulfonate containing a substituted proportion of cupric dinonyl naphthalenesulfonate was tested for the control of late blight of celery (*Septoria apii-graveolentis*). The salt was applied in emulsion formulation which emulsion was obtained from a concentrate as described in Example IV. High-volume application rates (100 gallons/acre) were employed. Nine applications at 6-8 day intervals were made during the period of the tests. Disease control data and yield are given in Table IV.

Table IV

| Treatment | Dosage, Lbs./100 Gal./A. | Mean, Percent Disease | Mean, Trimmed Weight, gr.[1] |
|---|---|---|---|
| Cupric nonylated naphthalenesulfonate | 2 | 29.0 | 700.0 |
| Control | | 88.0 | 394.0 |

[1] Weight of "marketable" celery after the diseased foliage was removed.

EXAMPLE VII

Cupric mononyl-, dinonyl-, and (full range) nonyl naphthalenesulfonates and cupric ammonium dinonyl naphthalenesulfonate were tested for the control of late blight of potato (*Phytophthora infestans*). A total of ten applications were made at 2-7 day intervals during the trial. The high-volume application rate of 180 gallons per acre was employed in all treatments. The present copper salts were compared with a commercial fungicide sold under the trade name "Dithane Z-78" which comprises zinc ethylene bis-dithiocarbamate.

In a separate test, the cupric salt of oil-soluble petroleum sulfonic acids was tested for the control of late blight of potato (*Phytophthora infestans*). Seven applications of sprays were made at 6-7 day intervals. The high-volume application rate of 180 gallons per acre was employed in all treatments. The cupric petroleum sulfonate was also compared with "Dithane Z-78".

Disease control data for the different dosages employed for both tests are given in Table V.

Table V

| Treatment | Dosage, Lbs./100 Gal. at 180 Gal./A. | Average, Percent Disease |
|---|---|---|
| Cupric mononyl naphthalenesulfonate | 4 | 48.3 |
| Cupric dinonyl naphthalenesulfonate | 2 | 50.0 |
| | 4 | 46.7 |
| Cupric ammonium dinonyl naphthalenesulfonate | 2 | 43.3 |
| | 4 | 36.7 |
| Cupric (full range) nonyl naphthalenesulfonate | 4 | 45.0 |
| Dithane Z-78 | 2 | 40.0 |
| Control | | 76.7 |
| Cupric petroleum sulfonate | 2 | 93.3 |
| | 4 | 88.3 |
| Dithane Z-78 | 2 | 50.0 |
| Control | | 100.0 |

From the data in the above table, it can be seen that the copper salts of the present invention compared favorably with the standard fungicide, whereas cupric petroleum sulfonates did not.

Also, during the above tests with copper salts of the present invention, a second disease, early blight of potato (*Alternaria solani*), became established by the time the readings were taken. Thus, the data given above for the present copper salts reflect the degree of effectiveness in controlling not one, but two diseases.

EXAMPLE VIII

The combined foliage-fungicide activity index for four diseases, namely, *Phytophthora infestans* (late blight of tomato), *Septoria appi-graveolentis* (late blight of celery), *Erysiphe polygoni* (bean powdery mildew) and *Uromyces appendiculatus* (bean rust), was determined for cupric ammonium dinonyl naphthalenesulfonate and for the cupric ammonium salt of oil-soluble petroleum sulfonic acids. Cupric ammonium dinonyl naphthalenesulfonate was found to have a combined index of 0.87 whereas cupric ammonium petroleum sulfonate had a combined index of only 0.73.

We claim as our invention:

1. Cupric dinonyl naphthalenesulfonate.
2. Cupric ammonium dinonyl naphthalenesulfonate.
3. A copper salt of a nonylated naphthalenesulfonic acid.
4. A method of treating plants for the control of fungi which comprises applying to the plants an effective toxic amount of cupric dinonyl naphthalenesulfonate.
5. A method of treating plants for the control of fungi which comprises applying to the plants an effective toxic amount of cupric ammonium dinonyl naphthalenesulfonate.
6. A method of treating plants for the control of fungi which comprises applying to the plants an effective toxic amount of a copper salt of a nonylated naphthalenesulfonic acid.
7. A fungicidal concentrate composition comprising cupric dinonyl naphthalenesulfonate, a hydrocarbon solvent and an emulsifier suitable for dispersing said composition in water.
8. A fungicidal concentrate composition comprising a copper salt of a nonylated naphthalenesulfonic acid, a hydrocarbon solvent, and an emulsifier suitable for dispersing said composition in water.

References Cited in the file of this patent
UNITED STATES PATENTS

| | | |
|---|---|---|
| 1,691,228 | Daimler et al. | Nov. 13, 1928 |
| 2,459,995 | Duncan | Jan. 25, 1949 |
| 2,534,277 | Liberthson et al. | Dec. 19, 1950 |
| 2,536,095 | Rosenzweig et al. | Jan. 2, 1951 |
| 2,562,845 | Reamer | July 31, 1951 |

FOREIGN PATENTS

| | | |
|---|---|---|
| 527,618 | Germany | June 25, 1931 |